US008993900B2

(12) United States Patent
Yamazaki

(10) Patent No.: US 8,993,900 B2
(45) Date of Patent: Mar. 31, 2015

(54) SOLAR CELL MODULE TERMINAL AND SOLAR CELL MODULE TERMINAL BOX

(75) Inventor: Masakazu Yamazaki, Yao (JP)

(73) Assignee: Hosiden Corporation, Osaka (JP)

( * ) Notice: Subject to any disclaimer, the term of this patent is extended or adjusted under 35 U.S.C. 154(b) by 350 days.

(21) Appl. No.: 13/359,984

(22) Filed: Jan. 27, 2012

(65) Prior Publication Data
US 2012/0211062 A1 Aug. 23, 2012

(30) Foreign Application Priority Data

Feb. 23, 2011 (JP) ................... 2011-037491

(51) Int. Cl.
H01L 31/02 (2006.01)
H01B 7/06 (2006.01)
H01L 31/048 (2014.01)

(52) U.S. Cl.
CPC ............. *H01L 31/0485* (2013.01); *Y02B 10/12* (2013.01); *Y02E 10/50* (2013.01)
USPC .............. 174/520; 174/50; 174/535; 174/549

(58) Field of Classification Search
CPC ............. H05K 7/00; H05K 5/00; H05K 5/02; H05K 5/0247; H05K 5/0026; H05K 5/0065; H05K 5/0073
USPC ......... 174/50, 50.5, 50.51, 50.52, 50.54, 520, 174/521, 526, 252, 535, 545, 549; 361/748
See application file for complete search history.

(56) References Cited

U.S. PATENT DOCUMENTS

| 7,824,189 B1 * | 11/2010 | Lauermann et al. ......... 439/76.1 |
| 2006/0000504 A1 | 1/2006 | Feldmeier et al. |
| 2012/0060919 A1 | 3/2012 | Mills et al. |
| 2012/0122336 A1 | 5/2012 | Eusterholz |

FOREIGN PATENT DOCUMENTS

| DE | 102009033481 A1 | 1/2011 |
| EP | 2058867 A2 * | 5/2009 |
| JP | 6254972 A | 3/1987 |
| JP | 9312175 A | 12/1997 |
| JP | 2001-135847 A | 5/2001 |
| JP | 2005340821 A | 12/2005 |
| JP | 2011503884 A | 1/2011 |
| WO | 2009129405 A2 | 10/2009 |
| WO | 2010067466 A1 | 6/2010 |
| WO | WO 2010067466 A1 * | 6/2010 |

* cited by examiner

*Primary Examiner* — Hoa C Nguyen
*Assistant Examiner* — Amol Patel
(74) *Attorney, Agent, or Firm* — The Webb Law Firm

(57) ABSTRACT

A solar cell module terminal to be electrically connected to an electrode portion provided on a back face of a solar cell module for outputting an electric current generated by a solar cell to the outside. The terminal includes a terminal body, a fixing portion to be fixed to the electrode portion, and a deforming portion provided between the terminal body and the fixing portion for allowing the terminal body and the fixing portion to be movable relative to each other along an anticipated direction of displacement of the electrode portion.

2 Claims, 5 Drawing Sheets

SOLAR CELL MODULE TERMINAL AND SOLAR CELL MODULE TERMINAL BOX

TECHNICAL FIELD

The present invention relates to a solar cell module terminal to be mounted on the back face of a solar cell module and a solar cell module terminal box having the terminal.

BACKGROUND ART

In application of a solar cell module, many of them are joined with each other and mounted on e.g. a rooftop of a sunny building. In each solar cell module, a terminal box is attached to its back face. The terminal boxes of adjacent solar cell modules are electrically connected to each other via an external connection cable.

For instance, in Patent Literature 1, a ribbon-like electrode wire is employed as a lead wire for drawing output from a solar cell module. This ribbon-like electrode wire is extended from inside of the solar cell module to be exposed to the outside and the wire is fixed to the outer face of the solar cell module without any gap relative thereto. Then, as an end portion of a terminal plate inside the terminal box is fixedly attached to this ribbon-like electrode wire by means of e.g. soldering, electrical connection is provided therebetween.

CITATION LIST

Patent Literature

[Patent Literature 1] WO2010/067466 publication gazette

SUMMARY OF INVENTION

Technical Problem

In the construction of Patent Literature 1, the end portion of the terminal plate is connected in the direction perpendicular to the longitudinal direction of the ribbon-like electrode wire. Under the condition where the ribbon-like electrode wire of the solar cell module is electrically connected to the terminal plate inside the terminal box, the ribbon-like electrode wire exposed on the external face of the solar cell module may be subject to influence of temperature change, thus being expanded/contracted and displaced along the longitudinal direction. The terminal plate described in Patent Literature 1 has a shape having spring-like characteristics at its terminal end.

However, this spring-like characteristics is provided for use in positional alignment between the end portion of the terminal plate and the ribbon-like electrode wire. Therefore, if the displacement of the ribbon-like electrode wire occurs after fixed attachment of the end portion of the terminal plate to the ribbon-like electrode wire, the spring-like characteristics of the end portion of the terminal plate may hardly exhibit its effect. For this reason, it sometimes happens that the end portion of the terminal plate will detach from the ribbon-like electrode wire, thus causing connection failure.

Further, after the boding of the terminal box per se to the solar cell module also, due to a change in this bonded condition, positional displacement of the terminal box relative to the solar cell module may sometimes occur. In this case too, as the end portion of the terminal plate tends to be displaced relative to the ribbon-like electrode wire, the end portion of the terminal plate may be detached from the ribbon-like electrode wire, thus causing connection failure.

The object of the present invention is to provide a solar cell module terminal that can effectively prevent occurrence of connection failure between an electrode portion and a terminal plate provided in a solar cell module due to relative movement therebetween.

Solution to Problem

According to the first characterizing feature of a solar cell module terminal of the present invention, there is provided a solar cell module terminal to be electrically connected to an electrode portion provided on a back face of a solar cell module for outputting an electric current generated by a solar cell to the outside, the solar cell module terminal comprising:
a terminal body;
a fixing portion to be fixed to the electrode portion; and
a deforming portion provided between the terminal body and the fixing portion for allowing the terminal body and the fixing portion to be movable relative to each other along an anticipated direction of displacement of the electrode portion.

When expansion/contraction occurs in the electrode wire of the electrode portion provided in the solar cell module as being subject to an influence of temperature change or the like, the electrode portion will be displaced. In correspondence with this displacement of the electrode portion, the fixing portion on the terminal side will be moved as well. In this case, if the terminal body and the fixing portion are disposed via a deforming portion therebetween so that the terminal body and the fixing portion can move relative to each other along the anticipated displacement direction of the electrode portion, as in the above-described construction, even if such displacement occurs in the electrode portion due to e.g. expansion/contraction of the electrode wire, movement of the fixing portion relative to the terminal body is allowed by an amount of deformation of the deforming portion. As a result, favorable connection condition can be maintained between the electrode portion of the solar cell module and the fixing portion of the terminal side.

Furthermore, even when the electrode portion of the solar cell module and the terminal body move relative to each other due to e.g. an external force, as the deforming portion is deformed, favorable connection condition between the electrode portion of the solar cell module and the fixing portion of the terminal side can be maintained.

According to the second characterizing feature of the solar cell module of the present invention, said deforming portion has a U-shaped bent portion.

If the deforming portion has a U-shaped bent portion as in the above-described arrangement, even when relative movement occurs between the electrode portion of the solar cell module and the terminal body, as deformation occurs in the deforming portion in the form of a change in the curvature of the U-shaped bent portion or twisting/flexion of the deforming portion, a resultant change in the distance between the terminal body and the fixing portion can be effectively absorbed thereby. Consequently, the contact condition between the electrode portion of the solar cell module and the fixing portion of the terminal side can be maintained. Also, the deforming portion can be readily provided by the U-shaped bent portion.

According to the third characterizing feature of the solar cell module of the present invention, said U-shaped bent portion is formed to project away from the back face of the solar cell module; and the distance of said deforming portion from the terminal body side to a folded portion of said bent portion in the direction perpendicular to the back face of the solar cell module is set greater than the distance from the fixing portion to the terminal body side of the deforming portion in the same direction.

If the U-shaped bent portion is formed to project away from the back face of the solar cell module as in the above-described arrangement, when the electrode portion of the solar cell module and the terminal body move relative to each other in response to e.g. an external force applied thereto in the direction perpendicular to the back face of the solar cell module, a bending force in this perpendicular direction is applied to the U-shaped bent portion to deform this portion. As a result, relative movement between the electrode portion of the solar cell module and the terminal body in this same perpendicular direction is allowed.

In the above, if the distance of said deforming portion from the terminal body side to a folded portion of said bent portion in the direction perpendicular to the back face of the solar cell module were shorter than the distance from the fixing portion to the terminal body side of the deforming portion in the same direction, the U-shaped bent portion would be short in its portion subject to the bending force, so there would arise the risk of loss in the flexibility at the time of deformation.

However, if the distance of said deforming portion from the terminal body side to a folded portion of said bent portion in the direction perpendicular to the back face of the solar cell module is set greater than the distance from the fixing portion to the terminal body side of the deforming portion in the same direction as in the above-described arrangement, sufficient length can be secured for the portion of the U-shaped bent portion subject to the bending force, so the flexibility at the time of deformation can be readily maintained.

As a result, the relative movement between the electrode portion of the solar cell module and the terminal body in the direction perpendicular to the back face of the solar cell module is allowed more reliably and the favorable connection condition between the electrode portion of the solar cell module and the fixing portion of the terminal side can be maintained.

According to the characterizing feature of a solar cell module terminal box of the present invention, a solar cell module terminal box comprises:

a terminal body;

a fixing portion to be electrically fixed to an electrode portion provided on a back face of a solar cell module for outputting an electric current generated by a solar cell to the outside; and a solar cell module terminal having a deforming portion provided between the terminal body and the fixing portion for allowing the terminal body and the fixing portion to be movable relative to each other along an anticipated direction of displacement of the electrode portion.

As a solar cell module terminal box comprises a solar cell module terminal having a deforming portion provided between the terminal body and the fixing portion for allowing the terminal body and the fixing portion to be movable relative to each other along an anticipated direction of displacement of the electrode portion, as in the above-described construction, even if displacement occurs in the electrode portion due to e.g. expansion/contraction of the electrode wire, movement of the fixing portion relative to the terminal body is allowed by an amount of deformation of the deforming portion. As a result, favorable connection condition can be realized between the electrode portion of the solar cell module and the fixing portion of the terminal side. So that, the electric output power of the solar cell can be stable.

DESCRIPTION OF EMBODIMENTS

Next, embodiments of a solar module terminal according to the present invention will be described with reference to the accompanying drawings.

Figure 1:
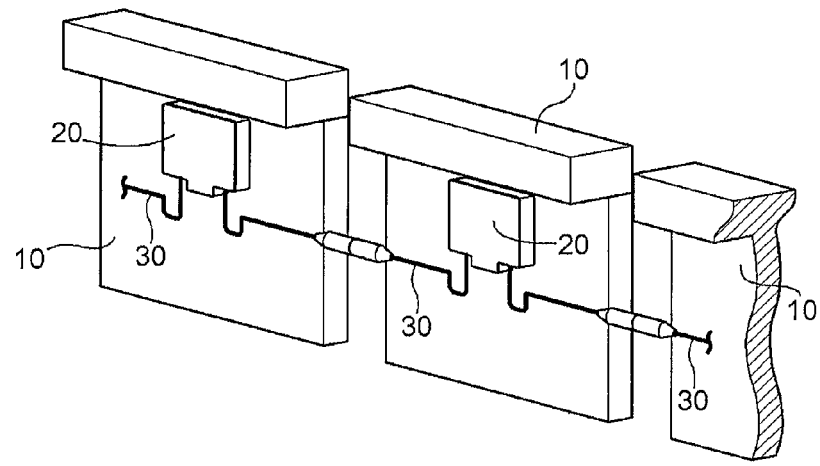
FIG. 1 is a schematic view showing the construction of a back face of a solar cell module.
Figure 2:
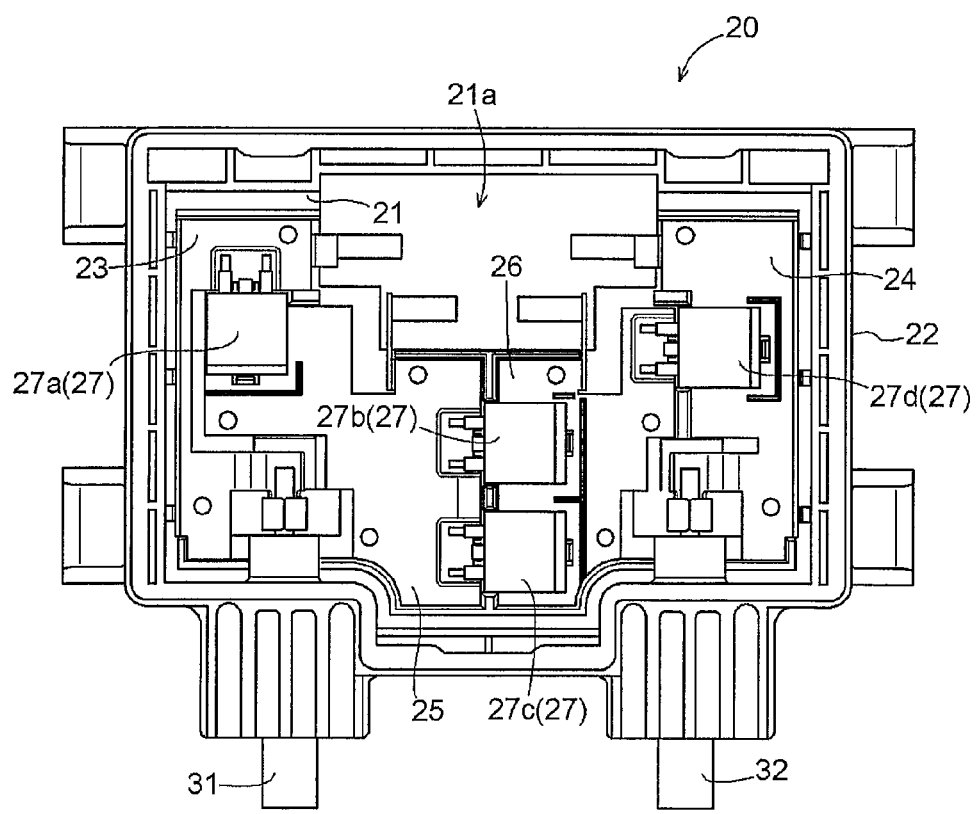
FIG. 2 is a plan view of a solar cell module terminal box.
Figure 3:
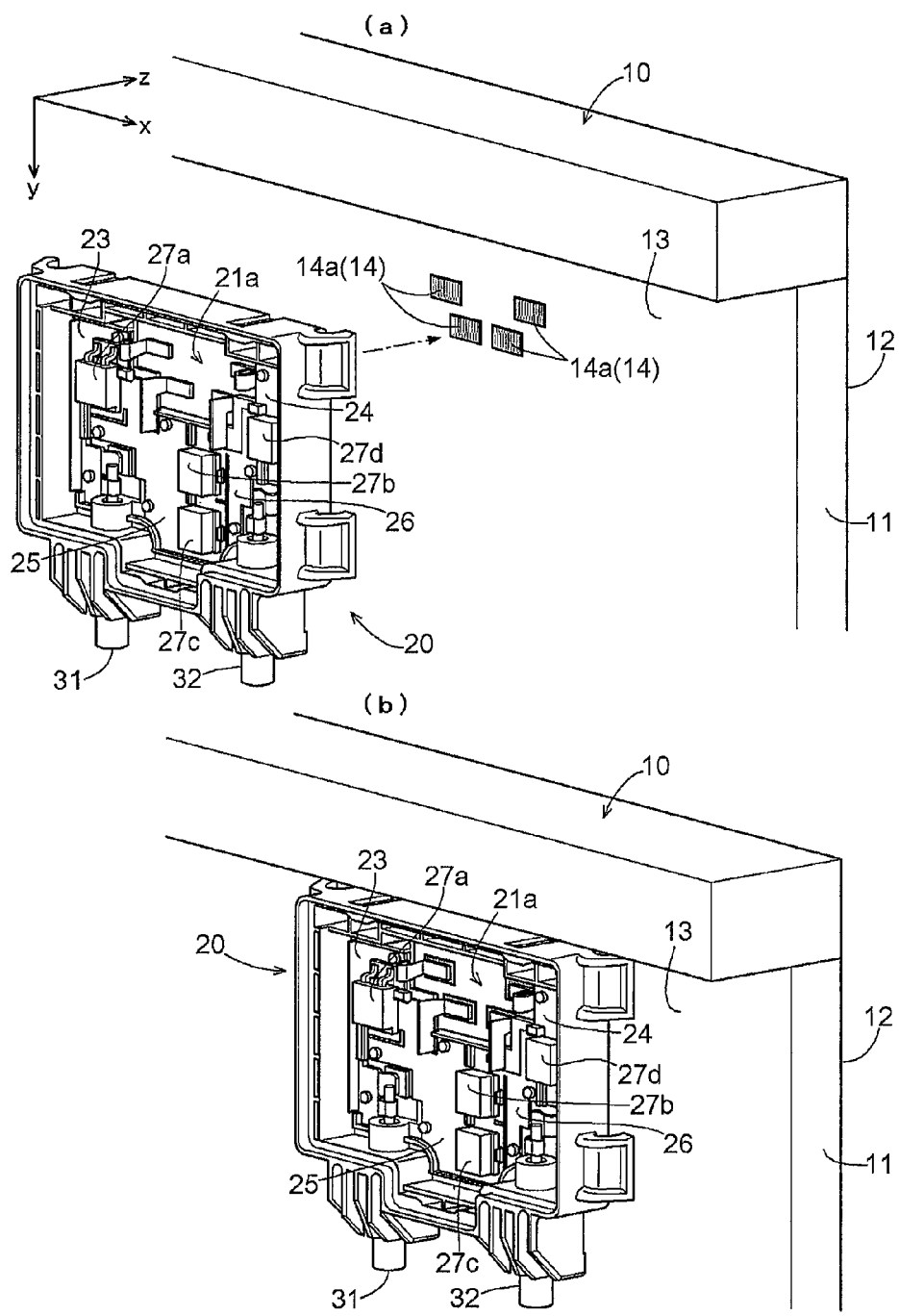
FIG. 3 is a diagram illustrating assembling steps of the solar cell module terminal box, (a) showing the solar cell module before assembly, (b) showing the solar cell module after assembly.

As shown in FIGS. 1 through 3, a solar cell module 10 includes a solar cell body 11, a front face member 12 formed of a material having permeability (transparency) such as glass or plastics, and a back face member 13 formed of a material having a structure of e.g. opposed faces of an aluminum foil clamped between resin films.

In the solar cell module 10, there are embedded ribbon-like electrode wires 14. And, as shown in FIG. 3, electrode end portions 14*a* are exposed from the back face member 13. This electrode end portion 14*a* is an electrode portion for outputting the electric power of the solar cell to the outside, which is fixedly attached to the back face member 13. The ribbon-like electrode wire 14 may sometimes be expanded/contracted along the longitudinal direction thereof as being influenced by e.g. temperature change. When the ribbon-like electrode wire 14 is expanded/contracted, the electrode end portion 14*a* too is displaced along the X axis (right/left) direction for example.

Incidentally, in the electrode portion of the solar cell module 10, a portion of the back face member 13 may be removed to expose the electrode end portion 14*a* of the ribbon-like electrode wire 14 on the outer side.

A terminal box 20 is formed like a box with a bottom plate 21, side walls 22 and an unillustrated lid plate. Inside the terminal box 20, there are mounted external connection terminal plates 23, 24 and intermediate terminal plates 25, 26. As seen in a plan view, the external connection terminal plates 23, 24 are mounted on the right and left opposed sides, and on the inner side of the external connection terminal plate 23, the intermediate terminal plate 25 is mounted, and on the inner side of the external connection plate 24, the intermediate terminal plate 26 is mounted, respectively. The respective ribbon-like electrode wires 14 of the solar cell module 10 are connected to the external connection terminal plates 23, 24 and the intermediate terminal plates 25, 26.

The bottom plate 21 is a portion of the box which is to face the back face member 13 of the solar cell module 10 when the terminal box 20 is mounted to the solar cell module 10. As shown in FIG. 2 and FIG. 3, the bottom plate 21 defines an opening portion 21*a*. So that, when the terminal box 2 is mounted to the solar cell module 10, the electrode end portions 14*a* exposed from the solar cell module 10 are connected through the opening portion 21*a* to the terminal plates 23-26 mounted within the terminal box 20; and the external connection terminal plate 23 is connected to the external connection cable 31, whereas the external connection terminal plate 24 is connected to the external connection cable 32.

The terminal plates are connected with each other via diodes 27. That is, a diode 27a is disposed between the external connection terminal plate 23 and the intermediate terminal plate 25. Between the intermediate terminal plate 25 and the intermediate terminal plate 26, two diodes 27b, 27c are disposed in parallel and spaced apart from each other. And, a diode 27d is disposed between the intermediate terminal plate 26 and the external connection terminal plate 24.

The diodes 27 are bypass diodes for short-circuiting an electric current generated in response to application of a reverse voltage caused by a drop in the electromotive force of the solar cell module 10 from one external connection cable 30 to the other external connection cable 30. The solar cell module 10 may exhibit reduction in the electromotive force of the panel due to various causes. With occurrence of blockage of impingement of solar light to some of the cells constituting the solar cell module 10 due to damage to such cells constituting the solar cell module 10 or influence of a shadow of a building, snowfall, etc, reduction can occur in the electromotive force of this solar cell module 10.

In such case as above, the voltage generated in the other normally operating solar cell module 10 will be applied in the form of a reverse voltage to the solar cell module 10 whose electromotive force has dropped. This will cause not only reduction in the power generation amount of the whole solar cell modules, but also an abnormal heat generation phenomenon ("hot spot") in the solar cell module 10 whose electromotive force has dropped. The bypass diodes are provided for preventing such reduction in the power generation amount and occurrence of the abnormal heat generation phenomenon. The bypass diodes serve to short-circuit the electric current at the time of application of reverse voltage from one external connection cable 30 to the other external connection cable 30, thereby bypassing the solar cell module 10 whose electromotive force has dropped.

Next, there will be explained a method of mounting the terminal box 20 to the solar cell module 10 with reference to FIG. 3 (a) and FIG. 3 (b). As shown in FIG. 3 (a), in the back face member 13 of the solar cell module 10, total four (two pairs) electrode end portions 14a in two upper and lower rows of the ribbon-like electrode wires 14 are exposed, with two end portions being included in each row. At the positions of these four electrode end portions 14a, fixing portions 23B-26B of the terminal plates 23-26 of the terminal box 20 are fixed by means of e.g. soldering.

Also, separately of the above, to the back face member 13 of the solar cell module 10, the bottom face of the terminal box 20 is bonded. In this way, the mounting of the terminal box 20 to the solar cell module 10 will be completed as shown in FIG. 3 (b).

Figure 4:
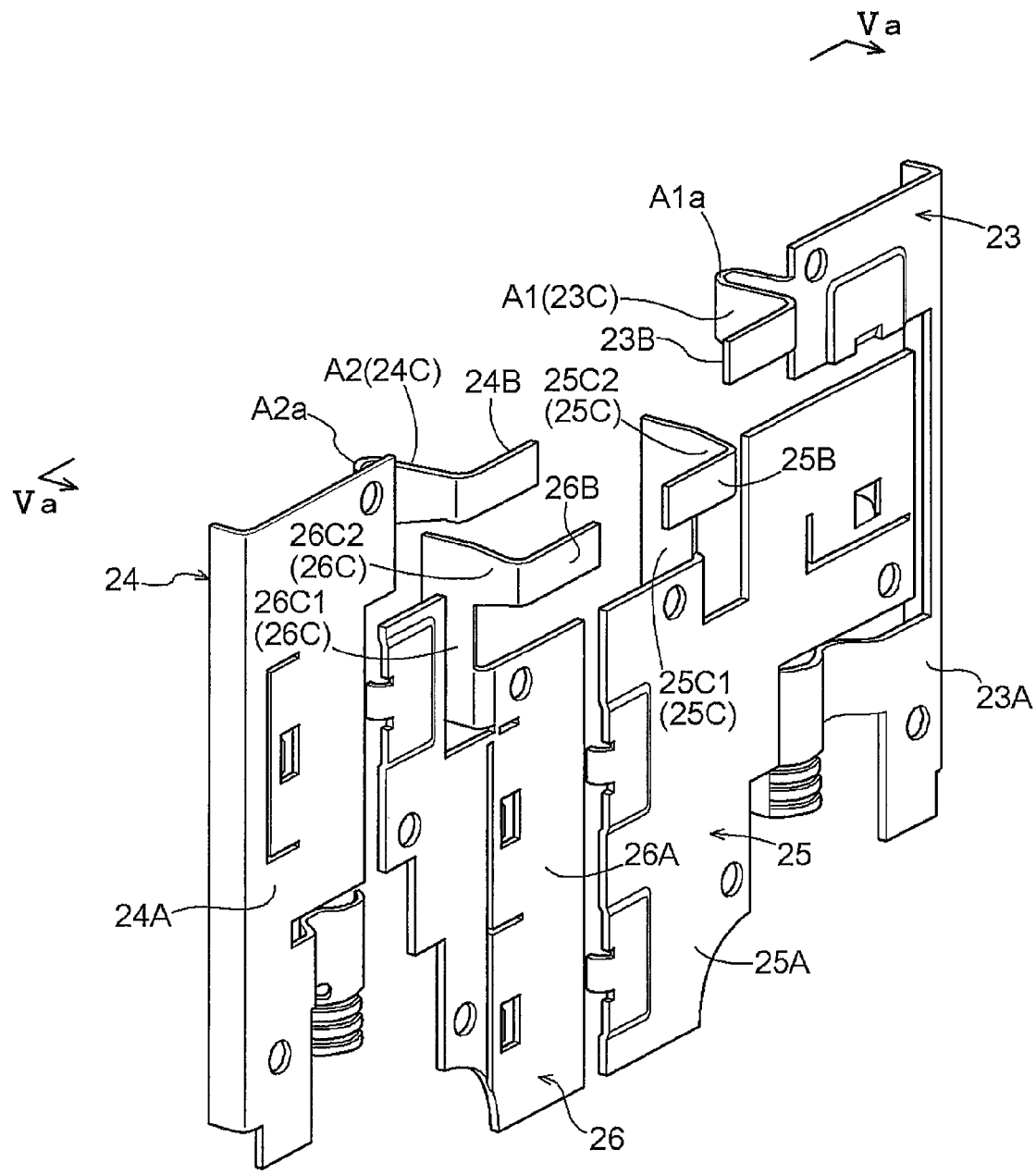
FIG. 4 is a perspective view of the back face of a terminal plate, FIG. 5 (*a*) is a plan view of the terminal plate as seen along a direction Va in FIG. 4, (*b*) is a view showing connected condition between the terminal plate and the solar cell module as seen along a direction Vb-Vb in FIG. 5.
Figure 5:
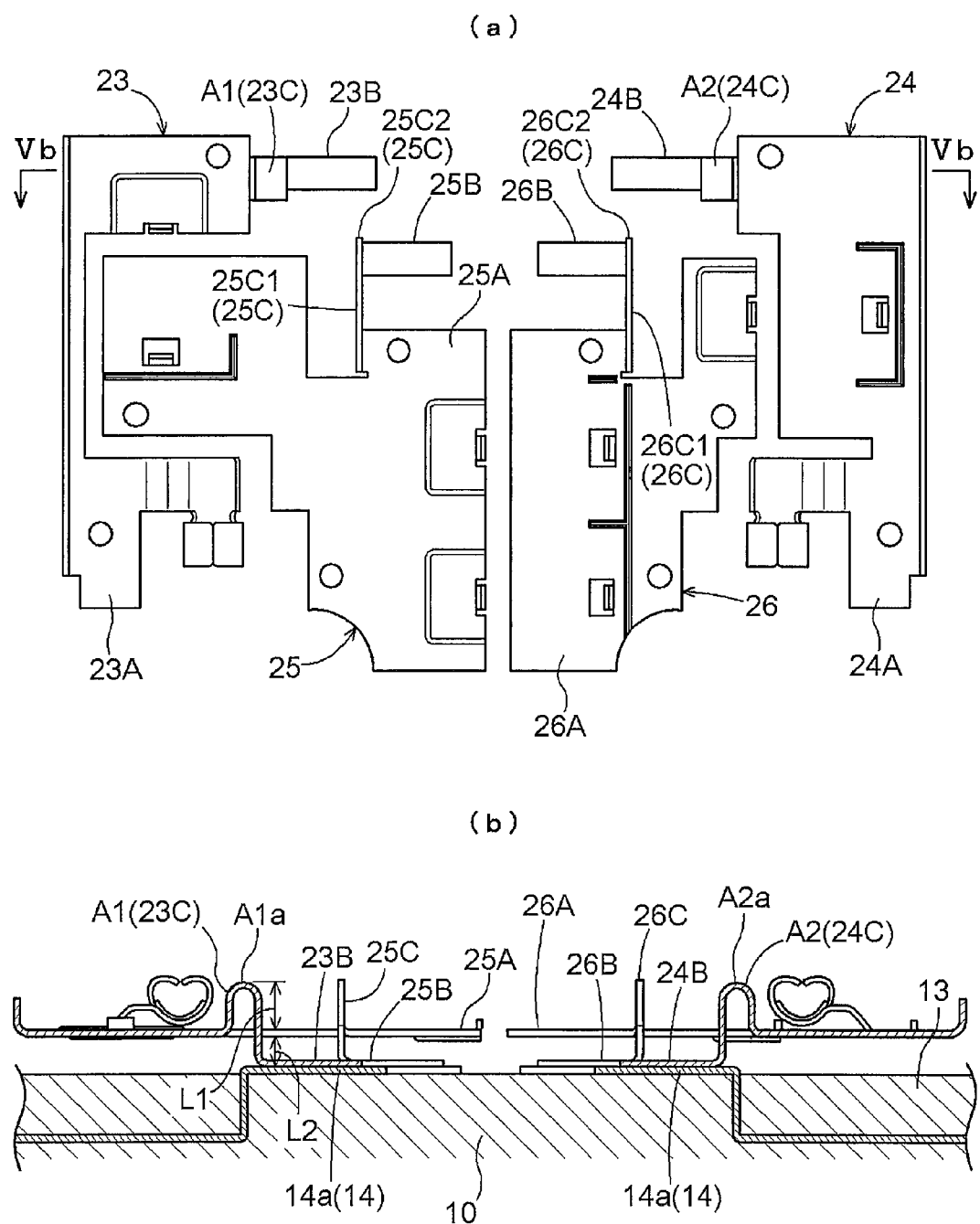

FIG. 4 is a perspective view showing the back face of the solar cell module terminal. FIG. 5 (a) is a plan view of the solar cell module terminal as seen along Va-Va in FIG. 4. FIG. 5 (b) is a view showing connected state of the terminal plate and the solar cell module in the section along Vb-Vb in FIG. 5 (a).

As shown in FIG. 4 and FIG. 5 (a), FIG. 5 (b), the external connection terminal plates 23, 24 include terminal bodies 23A, 24A and the fixing portions 23B, 24B fixedly attached to the electrode end portions 14a of the solar cell module 10. And, between the terminal bodies 23A, 24A and the fixing portions 23B, 24B, there are provided deforming portions 23C, 24C. These deforming portions 23C, 24C project along the right/left (X axis) direction along the back face of the solar cell module 10. Here, this right/left (X axis) direction is the anticipated direction of displacement of the electrode end portions 14a.

At portions of the deforming portions 23C, 24C, there are formed U-shaped bent portions A1, A2 extending vertically away from the back face of the solar cell module 10 and the rectangular fixing portions 23B, 24B are provided continuously from these U-shaped bent portions A1, A2. The U-shaped bent portions A1, A2 are deformable with opening/closing of the U-shaped portions along the right/left (X axis) direction on the back face of the solar cell module 10. Namely, with the deforming portions 23C, 24C, the terminal bodies 23A, 24A and the fixing portions 23B, 24B are movable relative to each other along the anticipated direction of displacement of the electrode end portions 14a.

Meanwhile, the U-shaped bent portions A1, A2 and the fixing portions 23B, 24B are provided in symmetry along the right/left (X axis) direction of the terminal box 20, in correspondence with the positions of the pair of electrode end portions 14a of the solar cell module 10.

In the external connecting terminal plates 23, 24, the terminal side fixing portions 23B, 24B are fixedly attached to the electrode end portions 14a of the solar cell module 10 by means of soldering for instance. From this condition, even if the ribbon-like electrode wires 14 are expanded/contracted due to a temperature change thus causing displacement of the electrode end portions 14a along the right/left (X axis) direction for example, resultant change in curvature of the U-shaped bent portions A1, A2 or twisting or flexion of these portions causes deformation in the deforming portions 23C, 24C.

With the above, movements of the fixing portions 23B, 24B will be allowed with the terminal bodies 23A, 24A being maintained in their positions.

As a result, favorable connection condition between the electrode end portions 14a of the solar cell module 10 and the terminal side fixing portions 23B, 24B is maintained.

Hence, even when relative movement occurs between the electrode end portions 14a of the solar cell module 10 and the terminal bodies 23A, 24A due to an external force, this causes change in the curvature of the U-shaped bent portions A1, A2, thus causing deformation of the deforming portions 23C, 24C. Consequently, favorable connection condition between the electrode end portions 14a of the solar cell module 10 and the terminal side fixing portions 23B, 24B is maintained.

Between the electrode end portions 14a of the solar cell module 10 and the terminal bodies 23A, 24A, relative movement may occur due to e.g. influence of an external force, along the direction (Z axis direction) perpendicular to the back face of the solar cell module 10. Then, in the instant embodiment, the U-shaped bent portions A1, A2 are formed to project along the direction away from the back face of the solar cell module 10.

With the above arrangement, when the electrode end portions 14a of the solar cell module 10 and the terminal bodies 23A, 24B move relative to each other due to an external force or the like along the direction perpendicular to the back face of the solar cell module 10, the U-shaped bent portions A1, A2 receive a bending force along the direction perpendicular to the back face of the solar cell module 10, whereby the deforming portions 23C, 24C will be deformed.

As a result, the relative movement between the electrode end portions 14a of the solar cell module 10 and the terminal bodies 23A, 24A along the direction perpendicular to the back face of the solar cell module 10 is allowed.

In the above, supposing the distance L1 of the deforming portion 23C, 24C from the terminal body 23A, 24A side to a folded portion A1a, A2a of the bent portion A1, A2 in this perpendicular direction were shorter than the distance L2 from the fixing portion 23B, 24B to the terminal body 23A, 24A side of the deforming portion 23C, 24C in the same direction, the U-shaped bent portion A1, A2 would be short in its portion subject to the bending force, so there would arise the risk of loss in the flexibility at the time of deformation.

However, as provided in the instant embodiment, if the distance L1 of the deforming portion 23C, 24C from the terminal body 23A, 24A side to the folded portion A1a, A2a of the bent portion A1, A2 in this perpendicular direction is set longer than the distance L2 from the fixing portion 23B, 24B to the terminal body 23A, 24A side of the deforming portion 23C, 24C in the same direction, sufficient length can be secured for the portion of the U-shaped bent portion A1, A2 subject to the bending force, so the flexibility at the time of deformation can be readily maintained.

As a result, the relative movement between the solar cell module 10 and the terminal body 23A, 24A along the direction perpendicular to the back face of the solar cell module 10 is allowed in an even more reliable manner, so that the connection condition between the electrode end portion (electrode portion) 14a of the solar cell module 10 and the terminal side fixing portion 23A, 23B can be maintained favorably.

The intermediate terminal plates 25, 26 include terminal bodies 25A, 26A, and fixing portions 25B, 26B to be fixedly attached to the electrode end portions 14a of the solar cell module 10. And, between the terminal bodies 25A, 26A and the fixing portions 25B, 26B, there are provided deforming portions 25C, 26C. Each deforming portion 25C, 26C includes a first projecting portion 25C1, 26C1 projecting from the terminal body 25A, 26A along a first direction (upper) along the back face of the solar cell module 10 and a second projecting portion 25C2, 26C2 projecting along a second direction (the direction of the opening portion 21a of the bottom plate 21) perpendicular to the first direction (upper). The second projecting portions 25C2, 26C2 continuously form rectangular fixing portions 25B, 26B. The deforming portion 25C, 26C as a whole is an L-shaped thin plate and is mounted erect on the end portion of the terminal body 25A, 26A and is bent along the direction of the opening portion 21a of the bottom plate 21.

The intermediate terminal plate 25, 26 has its terminal side fixing portion 25B, 26B to be fixedly connected by soldering or the like to the electrode end portion 14a of the solar cell module 10. From this condition, even if expansion/contraction occurs in the ribbon-like electrode wire 14 due to a temperature change, thus causing displacement of the electrode end portion 14a e.g. along the right/left (X axis) direction, the other portion of the deforming portion 25C, 26C flexes about the base portion of the first projecting portion 25C1, 26C1 on the terminal body 25A, 26A side, along the back face of the solar cell module 10.

In this way, the deforming portions 25C, 26C allow the terminal bodies 25A, 26A and the fixing portions 25B, 26B to move relative to each other along the anticipated direction of displacement of the electrode end portions 14a. As a result, favorable connection condition between the electrode end portions 14a of the solar cell module 10 and the terminal side fixing portions 25B, 26B is maintained. As described above, the terminal bodies 25A, 26a and the fixing portions 25B, 26B are disposed via the deforming portions 25C, 26C therebetween so as to be capable of moving relative to each other along the anticipated direction of displacement of the electrode end portions 14a.

Meanwhile, the deforming portions 25C, 26C and the fixing portions 25B, 26B are provided in symmetry along the right/left (X axis) direction of the terminal box 20, in correspondence with the positions of the pair of electrode end portions 14a of the solar cell module 10.

When the electrode end portions 14a of the solar cell module 10 and the terminal bodies 25A, 26A move relative to each other along the direction (Z axis direction) perpendicular to the back face of the solar cell module 10 for instance, due to e.g. an external force, the base portions of the first projecting portion 25C1, 26C1 will be flexed and deformed.

With the above, displacement of the terminal side fixing portions 25B, 26B along the perpendicular (Z axis) direction relative to the electrode end portions 14a of the solar cell module 10 will be absorbed by the first projecting portions 25C1, 26C1 and the second projecting portions 25C2, 26C2. As a result, the connection condition between the electrode end portions (electrode portions) 14a of the solar cell module 10 and the terminal side fixing portions 23B, 24B is maintained.

Further, when the electrode portions 14a of the solar cell module 10 and the terminal bodies 25A, 26A move relative to each other along e.g. the vertical (Y axis) direction, the portions continuous from the first projecting portions 25C1, 26C1 to the second projecting portions 25C2, 26C2 will be flexed and deformed. With this, displacement of the terminal side fixing portions 25B, 26B relative to the electrode end portions 14a of the solar cell module 10 is effectively restricted, so that the connection condition between the electrode end portions (electrode portions) 14a and the fixing portions 25B, 26B is maintained.

[Other Embodiments]

Figure 6:
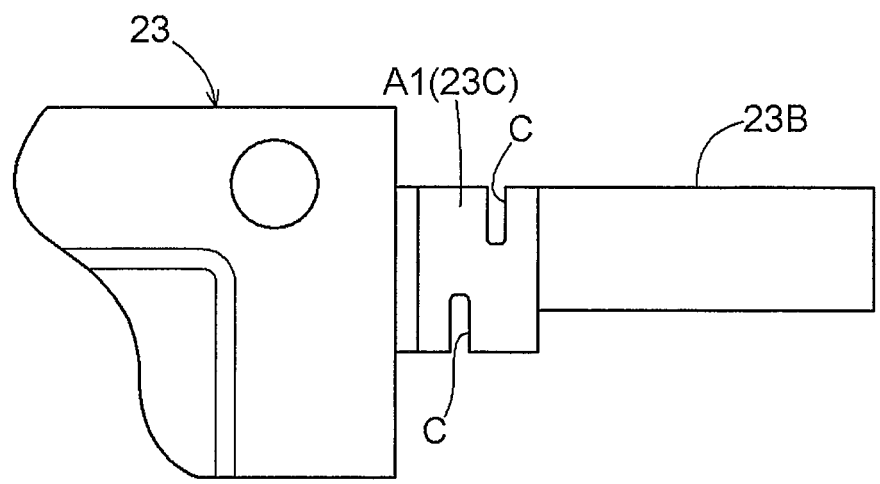
FIG. 6 is a view showing a deforming portion according to a further embodiment.

(1) Regarding the deforming portions 23C, 24C in the external connection terminal plates 23, 24 in the foregoing embodiment, for instance, as shown in FIG. 6, cutouts C or slits or the like may be provided at opposed ends of the U-shaped bent portions A1, A2 in the vertical (Y axis) direction. With this, as they are formed along the vertical width direction of the U-shaped bent portions A1, A2, with these narrow portions, the U-shaped bent portions A1, A2 can be easily twisted.

As a result, when the electrode portions 14a of the solar cell module 10 and the terminal bodies 23A, 24A move relative to each other along the vertical (Y axis) direction, a sufficient amount of twisting will occur in the U-shaped bent portions A1, A2 thus allowing relative movement therebetween.

(2) In the foregoing embodiment, as the anticipated direction of displacement of the electrode end portion (electrode portion) 14a, the right/left (X axis) direction along the back face of the solar cell module 10 was explained as an example thereof. Instead of this, the direction can be any other direction along the back face of the solar cell module 10 than the right/left (X axis) direction or the direction (Z axis) perpendicular to the back face of the solar cell module 10.

(3) In the foregoing embodiment, the deforming portions 23C-26C were formed integral with the terminal bodies 23A-26A. Instead, the deforming portions 23C-26C can be formed as members separate from the terminal bodies 23A-26A.

(4) In the foregoing embodiment, the second projecting portions 25C2, 26C2 of the intermediate terminal plates 25, 26 were formed to project toward the opening portion 21a of the bottom plate 21 (perpendicular relative to the back face of the solar cell module 10). Instead of this, the first projecting portions 25C1, 26C1 may be formed along the back face of the solar cell module 10.

Moreover, the first projecting portions 25C1, 26C1 of the intermediate terminal plates 25, 26 can be provided obliquely upward from the terminal plates 25A, 26A as seen in the plan view. And, the first projecting portions 25C1, 26C1 and the second projecting portions 25C2, 26C2 may be provided in the form of the dogleg shape as seen in the plan view.

(5) In the foregoing embodiment, the deforming portions 23C, 24C of the external connection terminal plates 23, 24 were configured to include the U-shaped bent portions A1, A2. Instead, the first projecting portions 25C1, 26C1 or the second projecting portions 25C2, 26C2 of the intermediate terminal plates 25, 26 may be configured to include the U-shaped bent portions. Furthermore, the deforming portions 23C, 24C of the external connection terminal plates 23, 24 and the deforming portions 25C, 26C of the intermediate terminal plates 25, 26 may be formed all identical to each other.

(6) In the foregoing embodiment, there was explained the example of the terminal plate wherein the deforming portions 23C, 24C include the U-shaped bent portions A1, A2. However, the shape of the bent portions A1, A2 can be a shape other than the U-shaped, such as V-shape, a wave shape, etc. Further, the deforming portions 23C-26C of the terminal plates can be formed of elastic members.

(7) In the foregoing embodiment, there was shown the arrangement wherein the external connection terminal plates 23, 24 as well as the two intermediate terminal plates 25, 26 were provided as the terminal plates mounted inside the terminal box 20. However, in the terminal box relating to the present invention, the box may be devoid entirely of intermediate terminal plates or may include three or more intermediate terminal plates.

[Industrial Applicability]

The solar cell module terminal and the terminal box according to the present invention are capable of maintaining favorable electric connection condition, against not only displacement due to expansion/contraction of the output electrode of the solar cell module, but also relative displacement between the solar cell module and the terminal box.

The invention claimed is:

1. A solar cell module terminal comprising:
two external connection terminal plates, each comprising:
a terminal body; and
a fixing portion to be fixed to an electrode portion provided on a back face of a solar cell module and electrically connected thereto for outputting an electric current generated by a solar cell to the outside; and
two intermediated terminal plates disposed between said two external connection terminal plates, each intermediate plate having a terminal body and a fixing portion electrically connected to the electrode portion,
wherein each external connection terminal plate has a deforming portion provided between the terminal body and the fixing portion for allowing the terminal body and the fixing portion to be movable relative to each other along an anticipated direction of displacement of the electrode portion,
wherein said deforming portion has a U-shaped bent portion, and
wherein said U-shaped bent portion is formed to project away from the back face of the solar cell module; and the distance of said deforming portion from the terminal body side to a folded portion of said bent portion in the direction perpendicular to the back face of the solar cell module is set greater than the distance from the fixing portion to the terminal body side of the deforming portion in the same direction.

2. A solar cell module terminal box having a solar cell module terminal, the solar cell module terminal comprising:
two external connection terminal plates, each comprising:
a terminal body; and
a fixing portion to be fixed to an electrode portion provided on a back face of a solar cell module and electrically connected thereto for outputting an electric current generated by a solar cell to the outside; and
two intermediated terminal plates disposed between said two external connection terminal plates, each intermediate plate having a terminal body and a fixing portion electrically connected to the electrode portion,
wherein each external connection terminal plate has a deforming portion provided between the terminal body and the fixing portion for allowing the terminal body and the fixing portion to be movable relative to each other along an anticipated direction of displacement of the electrode portion,
wherein said deforming portion has a U-shaped bent portion, and
wherein said U-shaped bent portion is formed to project away from the back face of the solar cell module; and the distance of said deforming portion from the terminal body side to a folded portion of said bent portion in the direction perpendicular to the back face of the solar cell module is set greater than the distance from the fixing portion to the terminal body side of the deforming portion in the same direction.

* * * * *

UNITED STATES PATENT AND TRADEMARK OFFICE
CERTIFICATE OF CORRECTION

PATENT NO. : 8,993,900 B2
APPLICATION NO. : 13/359984
DATED : March 31, 2015
INVENTOR(S) : Masakazu Yamazaki Page 1 of 1

It is certified that error appears in the above-identified patent and that said Letters Patent is hereby corrected as shown below:

In the Claims

Column 9, Line 42, Claim 1, delete "intermediated" and insert -- intermediate --

Column 10, Line 25, Claim 2, delete "intermediated" and insert -- intermediate --

Column 10, Lines 26-27, Claim 2, after "intermediate" insert -- terminal --

Signed and Sealed this
Twenty-eighth Day of July, 2015

Michelle K. Lee
*Director of the United States Patent and Trademark Office*